US012594821B2

(12) United States Patent
Funada et al.

(10) Patent No.: US 12,594,821 B2
(45) **Date of Patent: *Apr. 7, 2026**

(54) BELT MOLDING AND METHOD FOR PRODUCING SAME

(71) Applicant: TOKAI KOGYO CO., LTD., Obu (JP)

(72) Inventors: Kazuhiro Funada, Obu (JP); Yoshiki Nukaya, Obu (JP)

(73) Assignee: TOKAI KOGYO CO., LTD., Obu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/018,286

(22) Filed: Jan. 13, 2025

(65) Prior Publication Data

US 2025/0144988 A1 May 8, 2025

Related U.S. Application Data

(62) Division of application No. 18/275,648, filed as application No. PCT/JP2022/001579 on Jan. 18, 2022, now Pat. No. 12,227,062.

(30) Foreign Application Priority Data

Feb. 4, 2021 (JP) ................................. 2021-016197

(51) Int. Cl.
*B60J 10/75* (2016.01)
*B60J 10/235* (2016.01)
(Continued)

(52) U.S. Cl.
CPC ............. *B60J 10/75* (2016.02); *B60J 10/235* (2016.02); *B29C 65/08* (2013.01);
(Continued)

(58) Field of Classification Search
CPC ....................................................... B60J 10/75
See application file for complete search history.

(56) References Cited

U.S. PATENT DOCUMENTS

| | | | | |
|---|---|---|---|---|
| 7,785,686 B2 * | 8/2010 | Fukui | ....................... | B60J 10/30 |
| | | | | 428/128 |
| 8,714,624 B2 * | 5/2014 | Fukui | .................... | B60J 10/235 |
| | | | | 296/146.1 |

(Continued)

FOREIGN PATENT DOCUMENTS

| | | | | | |
|---|---|---|---|---|---|
| CN | 114619861 A | * | 6/2022 | .............. | B60J 10/86 |
| CN | 115195429 A | * | 10/2022 | .............. | B60J 10/76 |

(Continued)

OTHER PUBLICATIONS

Oct. 25, 2022 Search Report issued in International Patent Application No. PCT/JP2022/035294.

(Continued)

*Primary Examiner* — Catherine A Kelly
(74) *Attorney, Agent, or Firm* — Oliff PLC

(57) ABSTRACT

A method for producing a belt molding includes: inserting an insertion portion of an end cap into a molding body such that the insertion portion faces a facing portion of the molding body while the facing portion is positioned on a vehicle interior side relative to the insertion portion; and forming a protruding portion in the molding body. The protruding portion protrudes on a vehicle exterior side relative to a vehicle interior side surface of the insertion portion. The protruding portion is formed by deforming a portion of the facing portion which is closer to the lid portion of the end cap relative to the catch surface.

7 Claims, 11 Drawing Sheets

(51) Int. Cl.

| | | |
|---|---|---|
| B29C 65/08 | (2006.01) | |
| B29L 31/30 | (2006.01) | |
| B60J 10/15 | (2016.01) | |
| B60J 10/27 | (2016.01) | |

(52) U.S. Cl.

CPC ... *B29K 2023/06* (2013.01); *B29L 2031/3014* (2013.01); *B60J 10/15* (2016.02); *B60J 10/27* (2016.02)

(56) References Cited

U.S. PATENT DOCUMENTS

| | | | | |
|---|---|---|---|---|
| 8,740,276 | B2 * | 6/2014 | Takeyoshi | B60R 13/04 |
| | | | | 52/716.5 |
| 10,328,781 | B2 * | 6/2019 | Hemauer | B60J 10/75 |
| 10,421,417 | B2 * | 9/2019 | Itoh | B60J 10/22 |
| 12,227,062 | B2 * | 2/2025 | Funada | B60J 10/235 |
| 2013/0008123 | A1 | 1/2013 | Aoi et al. | |
| 2013/0097962 | A1 * | 4/2013 | Yoshida | B60J 10/75 |
| | | | | 52/716.5 |
| 2025/0058528 | A1 * | 2/2025 | Funada | B29C 66/73921 |

FOREIGN PATENT DOCUMENTS

| | | | | | | |
|---|---|---|---|---|---|---|
| EP | 1652710 | A2 | * | 5/2006 | ............. | B60J 10/75 |
| JP | H05178097 | A | * | 7/1993 | ............. | B60J 10/75 |
| JP | 2002249001 | A | * | 9/2002 | ............. | B60R 13/04 |
| JP | 2004249745 | A | * | 9/2004 | ............. | B60J 10/75 |
| JP | 2005-001551 | A | | 1/2005 | | |
| JP | 2011-207333 | A | | 10/2011 | | |
| JP | 2013-067341 | A | | 4/2013 | | |
| JP | 2013256194 | A | * | 12/2013 | | |
| JP | 5909959 | B2 | * | 4/2016 | ............. | B60J 10/75 |
| JP | 2017056845 | A | * | 3/2017 | | |
| JP | 2017144775 | A | * | 8/2017 | ............. | B60R 13/04 |
| JP | 2018012352 | A | * | 1/2018 | | |
| JP | 2018131082 | A | * | 8/2018 | ............ | B60J 5/0402 |
| JP | 2019189006 | A | * | 10/2019 | | |

OTHER PUBLICATIONS

Oct. 25, 2022 Written Opinion of the International Searching Authority issued in International Patent Application No. PCT/JP2022/035294.

U.S. Appl. No. 18/723,068, filed Jun. 21, 2024 in the name of Funada et al.

* cited by examiner (A)
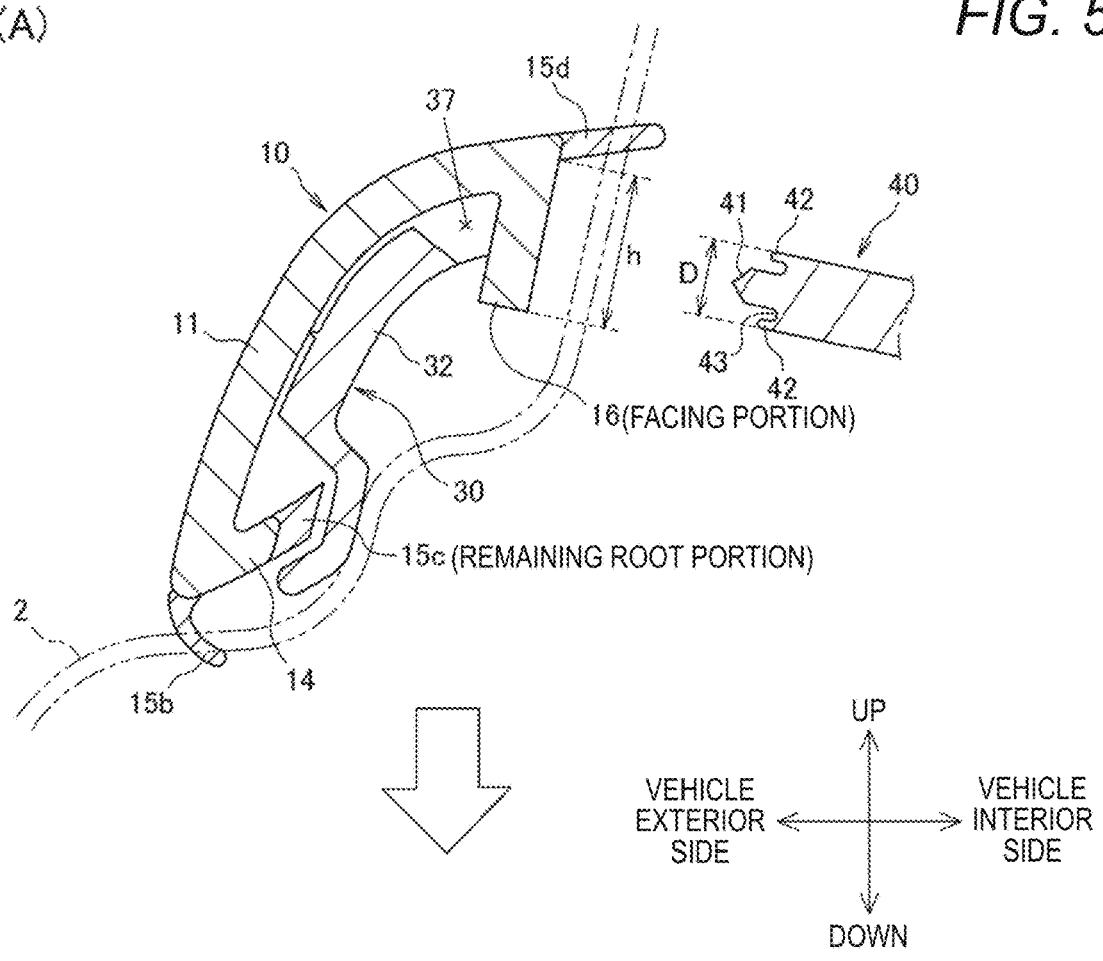
*FIG. 5*
16 (FACING PORTION)
15c (REMAINING ROOT PORTION)
UP
VEHICLE
EXTERIOR
SIDE ← → VEHICLE
INTERIOR
SIDE
DOWN
(B)
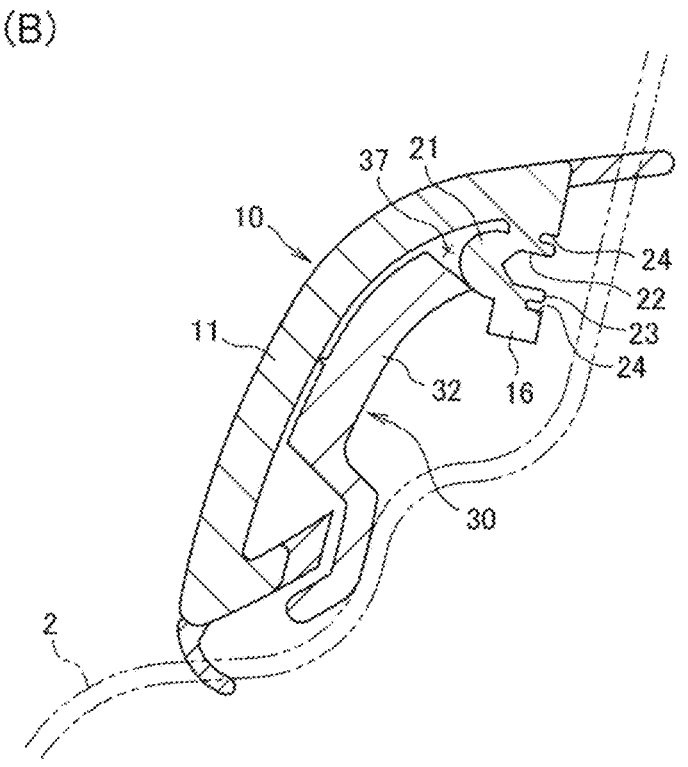

(A)

(B)

VEHICLE
INTERIOR
SIDE

REAR ← → FRONT

VEHICLE
EXTERIOR
SIDE (A)

UP

REAR ←——→ FRONT

DOWN (B)

(A)

15c (REMAINING ROOT PORTION)

UP

REAR     FRONT

DOWN (B)

BELT MOLDING AND METHOD FOR PRODUCING SAME

This is a divisional application of U.S. patent application Ser. No. 18/275,648 filed on Aug. 3, 2023, which is a National Stage Entry of PCT/JP2022/001579 filed on Jan. 18, 2022, which claims the benefit of JP 2021-016197 filed on Feb. 4, 2021. Each of the prior applications is hereby incorporated by reference in entirety.

TECHNICAL FIELD

The present invention relates to a belt molding for a vehicle. In particular, the present invention relates to a type of a belt molding in which an end cap is attached to one end of a long belt molding body. Examples of objects to which such a belt molding is attached include a front door and a rear door of a vehicle.

BACKGROUND ART

Patent Literature 1 relates to a vehicle molding including a long molding body and a molding end cap, and particularly relates to a method for attaching the molding end cap (see paragraphs 0001 and 0002). According to FIGS. 9 to 14 and paragraphs 0036 to 0045 of the same literature, in the attaching method, after an ultrasonic horn 40 is disposed to face a molding body 10 and a molding end cap 20, a cap support portion 22 of the molding end cap is pressurized toward the molding body 10 by the ultrasonic horn 40 subjected to ultrasonic vibration (FIGS. 10 and 11). Then, a part of the molding body 10 and a part of the cap support portion 22 melt due to frictional heat of the ultrasonic vibration, and a contact portion 43 of the ultrasonic horn is pushed into the cap support portion 22 along a pressure application direction (FIG. 12). In association with the pushing of the contact portion 43, the melted part of the cap support portion 22 is embedded in the molding body 10 in a molten or softened state (an embedded portion 22a in FIG. 13). Then, with such embedding, ultrasonic welding of the molding end cap 20 to the molding body 10 is completed (FIG. 14).

CITATION LIST

Patent Literature

Patent Literature 1: JP5909959B2

SUMMARY OF INVENTION

Technical Problem

However, the technique according to Patent Literature 1 also has the following limitations (restrictions) or concern.

First, according to paragraph 0016 in Patent Literature 1, in order to weld the molding end cap to the molding body, the molding body and the molding end cap are preferably formed of different resin materials having relatively close melting points. That is, there is an inevitable limitation (restriction) in selecting materials for the molding body 10 and the molding end cap 20. Second, in Patent Literature 1, a method of applying pressure to the cap support portion 22 of the molding end cap 20 by the ultrasonic horn 40 subjected to ultrasonic vibration is adopted, and thus when the molding end cap is formed of a slightly brittle resin such as polybutylene terephthalate (PBT), the molding end cap may be broken (cracked) by the pressure applied by the ultrasonic horn.

An object of the present invention is to provide a belt molding capable of fixing an end cap to a molding body without excessively limiting a selection of materials for the molding body and the end cap, and a method for producing the belt molding.

Solution to Problem

An invention is characterized by a method for producing a belt molding configured to be attached along an upper edge of a door panel of a vehicle door, the belt molding including a long molding body made of a thermoplastic resin, and an end cap configured to be attached to one end portion of the molding body, the method including:

a step of preparing the molding body, the molding body including a vehicle exterior side wall portion and a vehicle interior side wall portion facing each other, and a top wall portion integrally connecting the two side wall portions, the vehicle interior side wall portion including a side wall remaining portion formed by removing a part of the vehicle interior side wall portion in a vicinity of an end of the molding body;

a step of preparing the end cap, the end cap including a lid portion configured to close an opening end of the molding body, and an insertion portion extending from the lid portion and configured to be inserted between the vehicle exterior side wall portion of the molding body and the side wall remaining portion, the insertion portion including a vehicle interior side surface extending along an insertion direction of the end cap on a vehicle interior side, the insertion portion on which a catch surface provided to intersect the vehicle interior side surface is formed;

an inserting step of inserting the insertion portion of the end cap into the molding body such that the insertion portion of the end cap is disposed to face a part of the molding body while the part of the molding body (hereinafter, referred to as a "facing portion") is positioned on a vehicle interior side relative to the insertion portion and faces the insertion portion; and a protruding portion forming step of forming a protruding portion in the molding body, the protruding portion protruding on a vehicle exterior side relative to the vehicle interior side surface of the insertion portion of the end cap, by deforming a portion of the facing portion of the molding body, the portion of the facing portion of the molding body being closer to the lid portion of the end cap relative to the catch surface, in which movement of the end cap in a direction opposite to the insertion direction can be prevented based on engagement between the protruding portion of the molding body and the catch surface of the end cap.

According to the invention, the protruding portion formed by deforming a part of the facing portion of the molding body is caused to protrude on the vehicle exterior side relative to the vehicle interior side surface of the insertion portion of the end cap, and thus the movement of the end cap in the direction opposite to the insertion direction is prevented based on the engagement (that is, mechanical interference) between the protruding portion and the catch surface of the insertion portion of the end cap, and the end cap can be prevented from falling off from the molding body. In this method, the molding body and the end cap are not welded to each other, and thus the molding body and the end cap do not need to be formed of materials having close melting points, and there is little restriction on a selection of materials (degree of freedom of the selection of materials is high). In the protruding portion forming step, the molding body is deformed and there is no need to deform the end cap, and thus the end cap may not be broken even if the end cap is made of a material which is easy to break.

The invention may be further characterized by the method for producing a belt molding, in which in the protruding portion forming step, a part of the facing portion of the molding body is melted and deformed to form the protruding portion.

In addition to the effect of the invention discussed earlier, the following effect is further exhibited. That is, by employing melting as a deformation method, a part of the facing portion of the molding body can be easily deformed, and the protruding portion can be easily formed.

The invention may be further characterized by the method for producing a belt molding, in which in the protruding portion forming step, an ultrasonic horn is brought into contact with the facing portion of the molding body to melt the part of the facing portion.

In addition to the effect of the invention discussed earlier, the following effect is further exhibited. That is, by using the ultrasonic horn, the part of the facing portion can be heated and melted in a pinpoint manner, and thus the protruding portion can be formed in a limited position or range. By stopping vibration of the ultrasonic horn, the melting of the resin can be immediately stopped (finished in a short time), and the deformation due to the melting can be easily controlled.

The invention may be further characterized by the method for producing a belt molding, in which the ultrasonic horn includes a tip projecting portion formed at a tip of the ultrasonic horn and an annular recessed portion formed at an outer peripheral edge of the tip projecting portion.

In addition to the effect of the invention discussed earlier, the following effect is further exhibited. That is, when the ultrasonic horn is used, while a portion that is in contact with the tip projecting portion is melted, the excessive molten resin can be received in the annular recessed portion and solidified in the annular recessed portion. Therefore, the excessive molten resin can be prevented from leaking out to the periphery of the protruding portion against an intention, and deterioration in appearance (degradation in appearance) can be prevented.

The invention may be further characterized by the method for producing a belt molding, in which in the protruding portion forming step, as the part of the facing portion of the molding body is melted, a part of a melted thermoplastic resin enters between the facing portion and the insertion portion around the protruding portion and fills a gap, and then is solidified.

In addition to the effect of the invention discussed earlier, the following effect is further exhibited. That is, when the end cap is inserted into the molding body, a slight gap may be inevitably generated between the facing portion of the molding body and the insertion portion of the end cap. In this regard, according to this method, a part of the thermoplastic resin obtained by melting a part of the facing portion for forming the protruding portion enters the gap between the facing portion and the insertion portion around the protruding portion, and is solidified in a state in which the gap is filled. Accordingly, rattling between the molding body and the end cap can be prevented or controlled.

The invention may be further characterized by the method for producing a belt molding, in which an engaged portion is formed on the side wall remaining portion of the molding body which has been prepared, and an engaging portion configured to engage the engaged portion of the molding body is formed on the insertion portion of the end cap which has been prepared, and in the inserting step, the end cap is temporarily positioned with respect to the molding body based on mutual engagement between the engaging portion and the engaged portion.

In addition to the effect of the invention discussed earlier, the following effect is further exhibited. That is, according to this method, in the inserting step, the end cap can be temporarily positioned with respect to the molding body based on the mutual engagement between the engaging portion and the engaged portion, and thus the subsequent protruding portion forming step can be smoothly executed.

The invention may be further characterized by the method for producing a belt molding, in which after completion of formation of the protruding portion, the protruding portion and the catch surface are disposed adjacent to each other in a longitudinal direction of the belt molding and are in contact with each other.

In addition to the effect of the invention discussed earlier, the following effect is further exhibited. That is, rattling between the molding body and the end cap can be prevented or controlled by mutual contact between the protruding portion of the molding body and the catch surface of the end cap.

The invention may be further characterized by a belt molding configured to be attached along an upper edge of a door panel of a vehicle door, the belt molding including:

a long molding body made of a thermoplastic resin; and an end cap configured to be attached to one end portion of the molding body, in which the molding body includes a vehicle exterior side wall portion and a vehicle interior side wall portion facing each other, and a top wall portion integrally connecting the two side wall portions, the vehicle interior side wall portion including a side wall remaining portion formed by removing a part of the vehicle interior side wall portion in a vicinity of an end of the molding body, the end cap includes a lid portion configured to close an opening end of the molding body, and an insertion portion extending from the lid portion and configured to be inserted between the vehicle exterior side wall portion of the molding body and the side wall remaining portion, the insertion portion of the end cap includes a vehicle interior side surface extending along an insertion direction of the end cap on a vehicle interior side, the insertion portion on which a catch surface provided to intersect the vehicle interior side surface is formed, the molding body includes a facing portion, the facing portion being positioned on the vehicle interior side relative to the insertion portion of the end cap and facing the insertion portion when the end cap is attached to the molding body, and a portion of the facing portion of the molding body, the portion of the facing portion of the molding body being closer to the lid portion of the end cap relative to the catch surface, is formed with a protruding portion formed by deforming a part of the facing portion, and the protruding portion protrudes on a vehicle exterior side relative to the vehicle interior side surface of the insertion portion of the end cap such that movement of the end cap in a direction opposite to the insertion direction can be prevented based on engagement with the catch surface.

According to the invention, the protruding portion formed by deforming a part of the facing portion of the molding body is caused to protrude on the vehicle exterior side relative to the vehicle interior side surface of the insertion portion of the end cap, and thus the movement of the end cap in the direction opposite to the insertion direction is prevented based on the engagement (that is, mechanical interference) between the protruding portion and the catch surface of the insertion portion of the end cap, and the end cap can be prevented from falling off from the molding body. In this configuration, the molding body and the end cap are not welded to each other, and thus the molding body and the end cap do not need to be formed of materials having close melting points, and there is little restriction on the selection of materials (degree of freedom of the selection of materials is high).

The invention may be further characterized by the belt molding, in which when the end cap is attached to the molding body, the protruding portion and the catch surface are disposed adjacent to each other in a longitudinal direction of the belt molding and are in contact with each other.

In addition to the effect of the invention discussed earlier, the following effect is further exhibited. That is, according to this configuration, rattling between the molding body and the end cap can be prevented or controlled by mutual contact between the protruding portion of the molding body and the catch surface of the end cap.

The invention may be further characterized by the belt molding, in which the protruding portion is formed by melting and deforming a part of the facing portion, and a thermoplastic resin obtained by melting a part of the facing portion enters between the facing portion and the insertion portion around the protruding portion and fills a gap.

In addition to the effect of the invention discussed earlier, the following effect is further exhibited. That is, when the end cap is attached to the molding body, a slight gap may be inevitably generated between the facing portion of the molding body and the insertion portion of the end cap. In this regard, according to this configuration, a part of the thermoplastic resin obtained by melting a part of the facing portion for forming the protruding portion enters the gap between the facing portion and the insertion portion around the protruding portion, and fills the gap. Accordingly, rattling between the molding body and the end cap can be prevented or controlled.

The invention may be further characterized by the belt molding, in which the facing portion is formed by the side wall remaining portion of the vehicle interior side wall portion, and the protruding portion is formed on the side wall remaining portion.

In addition to the effect of the invention discussed earlier, the following effect is further exhibited. That is, in this configuration, the facing portion where the protruding portion is to be formed is set in (the side wall remaining portion of) the vehicle interior side wall portion, and thus an area of the facing portion usable for forming the protruding portion (that is, the extent of the facing portion serving as a deformation target) can be secured to be relatively large. Therefore, a volume of the protruding portion obtained by the deformation of the facing portion can be secured to a necessary extent, and the end cap can be stably fixed to the molding body by the protruding portion.

The invention may be further characterized by the belt molding, in which the protruding portion is formed at two or more positions.

In addition to the effect of the invention discussed earlier, the following effect is further exhibited. That is, according to this configuration, the end cap can be more firmly fixed to the molding body by a plurality of protruding portions.

Advantageous Effects of Invention

As described above in detail, according to the belt molding and the producing method thereof of the present invention, the end cap can be fixed to the molding body without excessively limiting the selection of the materials for the molding body and the end cap.

BRIEF DESCRIPTION OF DRAWINGS

FIG. 5 illustrates cross sections taken along a line V-V in FIG. 3, in which (A) and (B) show a series of cross-sectional views illustrating an outline of a protruding portion forming step in the first embodiment.

DESCRIPTION OF EMBODIMENTS

Hereinafter, several embodiments of the present invention will be described with reference to the drawings.

Figure 1:
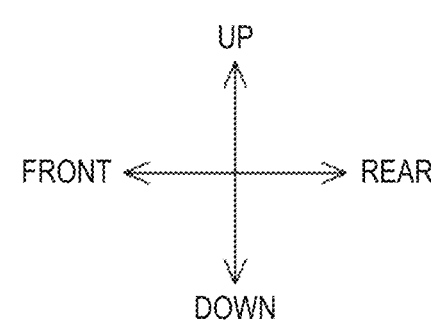
FIG. 1 is a schematic diagram illustrating a vehicle door (a front door).
Figure 1:
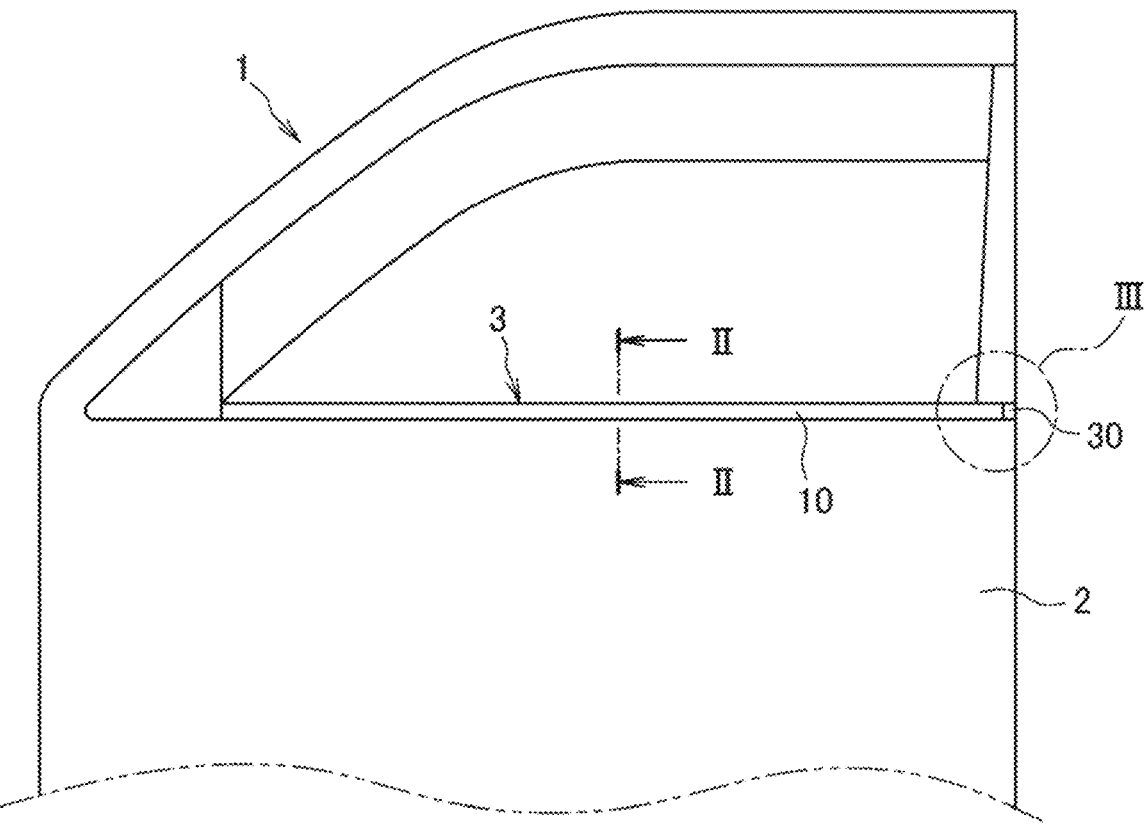

FIG. 1 illustrates a typical use example of a belt molding according to the present invention. As illustrated in FIG. 1, a belt molding 3 is attached to an outer-side door panel 2 constituting a lower half portion of a vehicle door 1 along an upper edge (a belt line) of the door panel 2. The belt molding 3 includes a main body portion (hereinafter, referred to as a "molding body") 10 of the long belt molding, and an end cap 30 attached to a rear end portion (a right end portion in FIG. 1) of the molding body 10.

Figure 2:
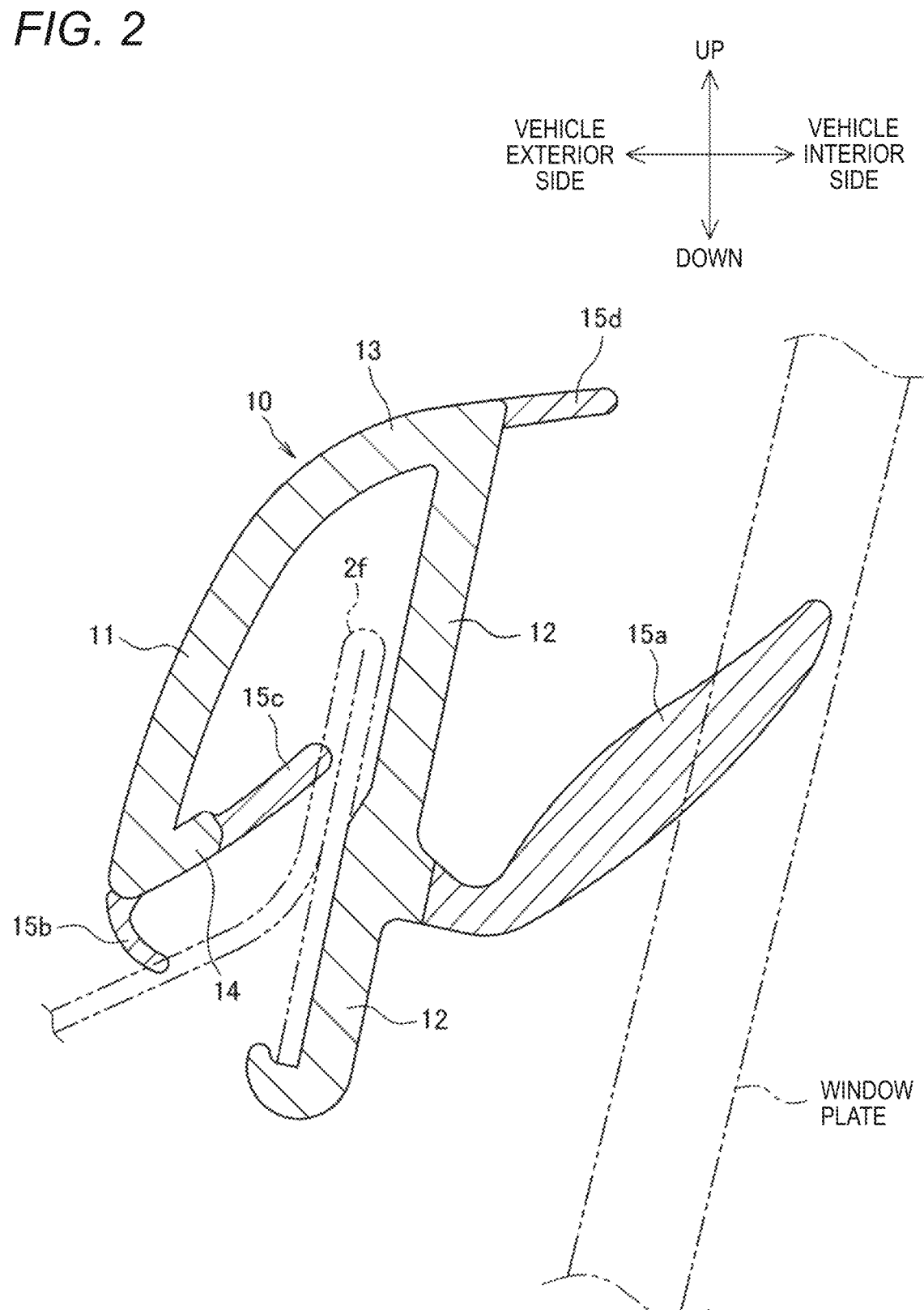
FIG. 2 is a cross-sectional view of a belt molding taken along a line II-II in FIG. 1.

As illustrated in FIG. 2, the molding body 10 includes a vehicle exterior side wall portion 11 and a vehicle interior side wall portion 12 facing each other, and a top wall portion 13 integrally connecting the two side wall portions 11 and 12. With the three wall portions (11 to 13), the molding body 10 has a substantially U-shaped cross section opening downward. A folded elongated protrusion 14 formed so as to be folded back toward a vehicle interior side is provided at a lower end of the vehicle exterior side wall portion 11. A vehicle interior side lip 15a is provided on a vehicle interior side wall surface of the vehicle interior side wall portion 12, a vehicle exterior side lip 15b is provided in the vicinity of the lower end of the vehicle exterior side wall portion 11, a holding lip 15c is provided at a tip of the folded elongated protrusion 14 at the lower end of the vehicle exterior side wall portion, and a decorative lip 15d is provided in the vicinity of a joint portion between the top wall portion 13 and the vehicle interior side wall portion 12. However, these lips 15a to 15d are generally known. When a flange 2f (indicated by an imaginary line) of the door panel 2 is inserted into a lower opening of the belt molding 3, the flange 2f is sandwiched between the holding lip 15c and the vehicle interior side wall portion 12, and the belt molding 3 is attached to the door panel 2.

The molding body 10 is preferably formed by extruding an olefin-based thermoplastic resin material. However, a relatively hard olefin-based thermoplastic resin (for example, polypropylene) is used for the three wall portions (11 to 13) and the elongated protrusion (14) of the molding body 10. On the other hand, a relatively soft olefin-based thermoplastic elastomer is used for the four lips (15a to 15d) other than the three wall portions and the elongated protrusion. The molding body 10 may be made of a material other than the olefin-based thermoplastic resin (for example, a styrene-based thermoplastic resin, vinyl chloride, rubber, or the like) as long as the material is meltable and elastically deformable.

The end cap 30 is preferably formed of polybutylene terephthalate (PBT) which is a kind of a thermoplastic resin. Examples of the thermoplastic resin that can be used for the end cap 30 include acrylonitrile butadiene styrene (ABS) resin, polypropylene (PP), polyacetal (POM), polyamide (PA), polyphenylene sulfide (PPS), and polyether ether ketone (PEEK), in addition to PBT.

The description so far is made to describe matters common to embodiments to be described below.

First Embodiment

Figure 3:
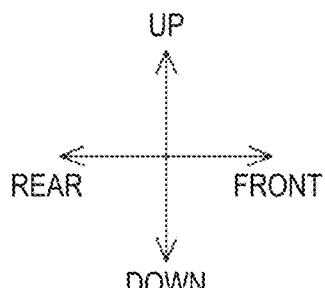
FIG. 3 is a rear side view of a belt molding (a portion surrounded by a circle III in FIG. 1) according to a first embodiment as viewed from a rear side.
Figure 3:
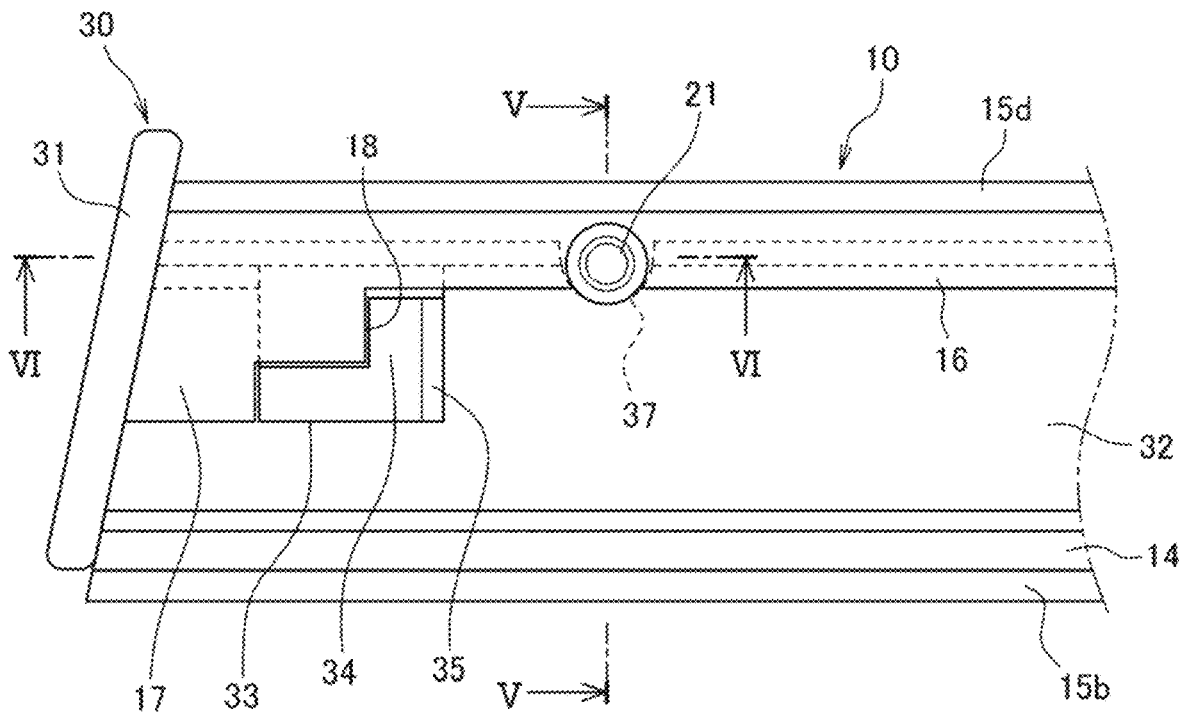
Figure 4:
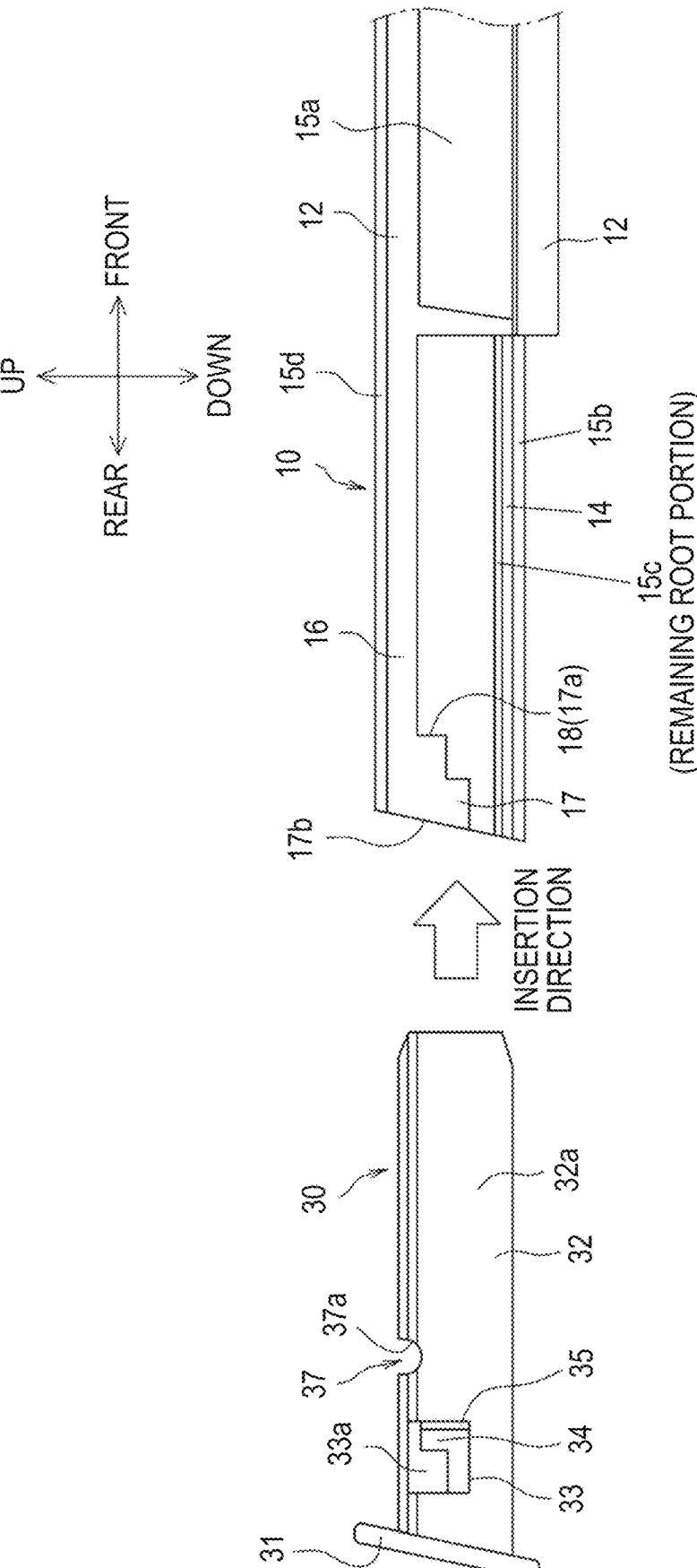
FIG. 4 is an exploded view (the rear side view) of the belt molding illustrated in FIG. 3.

FIGS. 3 to 6 illustrate a belt molding according to a first embodiment of the present invention. In particular, FIG. 4 is a diagram illustrating a state in which the molding body 10 and the end cap 30 are disassembled. As illustrated in FIG. 4, in the vicinity of the rear end portion of the molding body 10, mainly a lower side portion of the vehicle interior side wall portion 12 is removed, and an upper side portion of the vehicle interior side wall portion 12 remains (hereinafter, this remaining portion is referred to as a "side wall remaining portion 16"). The side wall remaining portion 16 does not include the vehicle interior side lip 15a, and along with the formation of the side wall remaining portion 16, a portion of the holding lip 15c of the vehicle exterior side wall portion 11 that faces the side wall remaining portion 16 is also substantially cut off while leaving only a root portion. An internal space for inserting and disposing an insertion portion 32 of the end cap 30 is defined by the three wall portions (the vehicle exterior side wall portion 11, the top wall portion 13, and the side wall remaining portion 16) positioned in the vicinity of the rear end portion of the molding body 10.

As illustrated in FIG. 3 and FIG. 4, an extension portion 17 is formed at an end of the molding body 10 by a part of the side wall remaining portion 16. The extension portion 17 is a side wall portion that extends downward from an upper edge of the vehicle interior side wall portion 12 and forms a portion of the side wall remaining portion 16. When the end cap 30 is attached to the molding body 10, the extension portion 17 is elastically deformable to some extent toward the vehicle interior side. The extension portion 17 includes a front side edge 17a and a rear side edge 17b, and an engaged portion 18 extending in a direction intersecting an insertion direction of the end cap is formed on the front side edge 17a. The rear side edge 17b of the extension portion 17 forms the rear end (an opening end) of the molding body 10.

As illustrated in FIG. 3 and FIG. 4, the end cap 30 includes a lid portion 31 and an insertion portion 32 extending substantially horizontally from a front surface of the lid portion 31 along a longitudinal direction (that is, the insertion direction) of the end cap. The lid portion 31 is a portion for closing the rear end (the opening end) of the molding body 10, and constitutes a rearmost end portion of the end cap 30. The insertion portion 32 is a portion that is to be inserted and disposed between the vehicle exterior side wall portion 11 and the side wall remaining portion 16 of the molding body 10. The insertion portion 32 includes a vehicle interior side surface 32a extending along the insertion direction of the end cap on the vehicle interior side.

The insertion portion 32 of the end cap is provided with a thick plate tab-shaped support portion (hereinafter, referred to as a "support tab") 33 formed to extend downward from an upper edge of the insertion portion 32. The support tab 33 is a part of the insertion portion 32 of the end cap. The support tab 33 has a substantially rectangular shape in a side view, and an engaging portion 34 protruding from a vehicle interior side surface 33a of the support tab 33 toward the vehicle interior side is provided at a position close to the front of the support tab 33. When the end cap 30 is inserted into the molding body 10, the engaging portion 34 functions as means for temporarily positioning (or temporarily fixing) the end cap 30 with respect to the molding body 10 based on mutual engagement with the engaged portion 18 of the extension portion 17. As illustrated in FIG. 4, an inclined surface 35 is formed at a front side position of the engaging portion 34 of the support tab 33. When the end cap 30 is inserted into the molding body 10, the inclined surface 35 functions as a pressing and guiding surface for pressing the extension portion 17 of the molding body toward the vehicle interior side to guide temporary elastic deformation.

Further, the end cap 30 according to the first embodiment includes a catch portion 37 formed on an upper side portion of the insertion portion 32 at a position in front of the support tab 33. The catch portion 37 is a recessed portion cut out in a substantially semicircular shape in a side view illustrated in FIG. 4, and the semicircular shape corresponds to an outer shape of a tip of an ultrasonic horn 40 to be described later (a circular shape). In consideration of assembly tolerance and the like, it is ordinary in design to set a radius of the semicircular shape of the catch portion 37 to be slightly larger than a radius of the circular shape of the ultrasonic horn, whereas in the present invention, it is preferable that the radii of both are substantially the same. The catch portion 37 includes a curved catch surface 37*a* (see FIGS. 4 and 6) on an inner side of the recessed shape, the catch surface 37*a* extending in vehicle interior and exterior directions (a width direction of the end cap). The catch surface 37*a* is in a positional relation of intersecting with the vehicle interior side surface 32*a* of the insertion portion 32 of the end cap, and acts to prevent movement of the end cap (that is, movement in a direction opposite to the insertion direction of the end cap) based on engagement with a protruding portion 21 to be described later.

Figure 6:
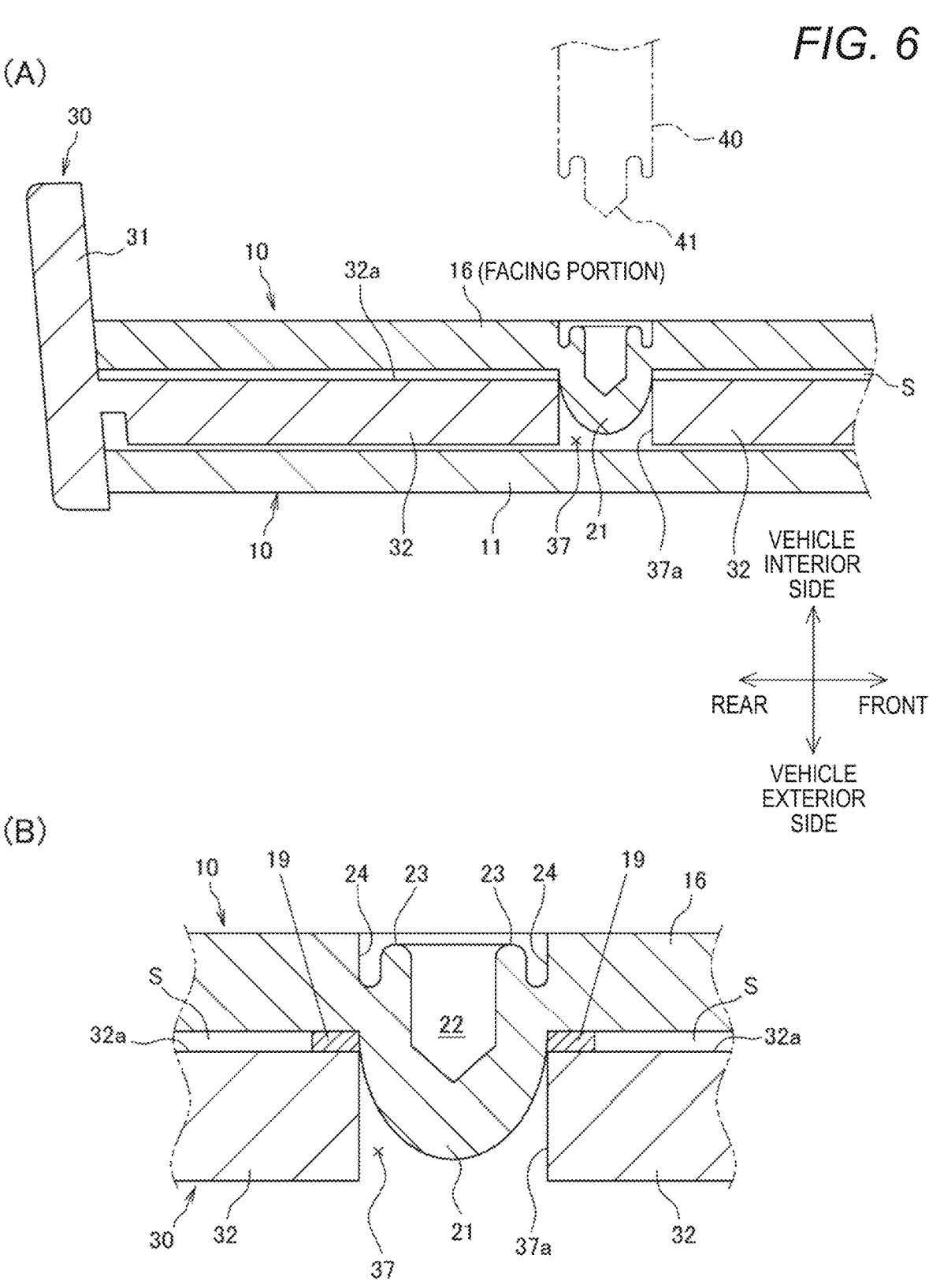
FIG. 6 illustrates (A) showing a cross section taken along a line VI-VI in FIG. 3, and (B) showing a partially enlarged cross-sectional view illustrating a part of (A) of FIG. 6 in an enlarged manner.

In FIG. 4 and FIG. 6, the catch portion 37 is illustrated as a recessed portion that penetrates the insertion portion 32 in the vehicle interior and exterior directions (the width direction of the end cap), but the catch portion 37 serving as a recessed portion does not need to penetrate the insertion portion 32, and may be a non-penetrating recessed portion in which the vehicle interior side surface 32*a* of the insertion portion 32 is merely recessed toward a vehicle exterior side. In short, a form (penetrating/non-penetrating) of the catch portion 37 is not limited as long as the catch surface 37*a* as described above can be provided.

Next, a method for attaching and fixing the end cap 30 to the molding body 10 (that is, a method for assembling the belt molding) will be described. After preparing the molding body 10 and the end cap 30 described above in advance, the method generally includes an inserting step of inserting and disposing the end cap 30 in the molding body 10, and a protruding portion forming step of fixing the end cap 30 to the molding body 10 by forming the protruding portion 21 to be described later in the molding body 10.

In the inserting step, the insertion portion 32 of the end cap 30 is inserted into the molding body from the opening end of the molding body 10. Then, first, the inclined surface 35 positioned on the front side of the engaging portion 34 of the end cap comes into contact with the rear side edge 17*b* of the extension portion 17 of the molding body. As the end cap 30 is further pushed in after the contact, the rear side edge 17*b* of the extension portion slides while contacting the inclined surface 35, and the extension portion 17 is progressively elastically deformed toward the vehicle interior side due to the pressing and guiding action of the inclined surface 35. Thereafter, when the end cap 30 is further pushed in and the engaging portion 34 of the end cap passes through (a position of) the extension portion 17, the sliding contact between the extension portion 17 and the engaging portion 34 is released, and the extension portion 17 that is temporarily elastically deformed returns to an original position or shape before the deformation. The lid portion 31 of the end cap comes into contact with the opening end of the molding body 10 substantially in synchronization with the return of the extension portion 17 from the elastically deformed state. Due to this contact, the end cap 30 cannot move further forward, and the insertion of the end cap 30 into the molding body 10 is completed (see FIG. 3 and FIG. 4).

In an insertion completion state, as illustrated in FIG. 3, the engaging portion 34 of the end cap 30 is disposed in front of the engaged portion 18 of the extension portion 17 of the molding body. Therefore, even if an external force in a pull-out direction (that is, the direction opposite to the insertion direction of the end cap) acts on the end cap 30, the engaging portion 34 is caught by the engaged portion 18, and the end cap 30 does not come off from the molding body 10. In this manner, the end cap 30 is temporarily positioned with respect to the molding body 10 based on the mutual engagement between the engaging portion 34 and the engaged portion 18. This is a prerequisite or preparation for smoothly executing the subsequent protruding portion forming step.

In the insertion completion state, as illustrated in (A) of FIG. 5 and (A) of FIG. 6, the upper side portion of the insertion portion 32 of the end cap 30 (in particular, in the vicinity of the catch portion 37) and the side wall remaining portion 16 of the molding body 10 are disposed to face each other. That is, in the present embodiment, the side wall remaining portion 16 serves as a "facing portion that is positioned on the vehicle interior side relative to the insertion portion (32) of the end cap and that faces the insertion portion (32)". As can be seen from (A) of FIG. 6, as a result of the insertion portion 32 and the side wall remaining portion 16 serving as the facing portion facing each other substantially in parallel, a gap S is inevitably formed between the both.

In the protruding portion forming step subsequent to the inserting step, by deforming (melting and deforming) a portion of the side wall remaining portion 16 serving as the facing portion, which is closer to the lid portion 31 relative to the catch surface 37*a* of the end cap, the protruding portion 21 protruding on the vehicle exterior side relative to the vehicle interior side surface 32*a* of the insertion portion 32 of the end cap is formed in the molding body 10. In the protruding portion forming step, the ultrasonic horn 40 as partially and schematically illustrated in (A) of FIG. 5 is used as melting deformation means. The ultrasonic horn 40 used in the present embodiment includes a tip projecting portion 41 having a circular cross section and an annular ridge 42 surrounding the tip projecting portion 41 at the tip of the ultrasonic horn 40. An annular recessed portion 43 is formed along an outer peripheral edge of the tip projecting portion 41 between the tip projecting portion 41 and the annular protrusion 42. The annular recessed portion 43 receives an excess of a resin melted by the tip projecting portion 41 and prevents an unintended spread of the molten resin.

(A) and (B) of FIG. 5 and (A) and (B) of FIG. 6 illustrate a specific procedure of the protruding portion forming step in which the ultrasonic horn 40 is used. When forming the protruding portion, the ultrasonic horn 40 is disposed on the vehicle interior side of the molding body 10, and a rear side surface of the lid portion 31 of the end cap 30 is brought into contact with a jig (not-illustrated) to position the end cap 30 and the molding body 10.

Then, as illustrated in (A) of FIG. 5 and (A) of FIG. 6, the ultrasonic horn 40 is disposed to face the side wall remaining portion 16 and the insertion portion 32 such that the tip projecting portion 41 of the ultrasonic horn 40 faces (directly faces) the catch portion 37 of the end cap with the side wall remaining portion 16 of the molding body interposed therebetween. After the tip projecting portion 41 of the ultrasonic horn 40 is pressed against the side wall remaining portion 16 at a substantially right angle, the ultrasonic horn 40 is subjected to ultrasonic vibration and slowly advanced toward the catch portion 37. Along with the contact, pressing, and advancing of the ultrasonic horn 40, a part of the side wall remaining portion 16 is heated and melted in a pinpoint manner, and the melted resin enters the catch portion 37 while being pressed by the tip projecting portion 41 of the ultrasonic horn, whereby the protruding portion 21 is formed (see (B) of FIG. 5, and FIG. 6). Thereafter, the ultrasonic horn 40 is separated from the side wall remaining portion 16, whereby the molten or softened protruding portion 21 is solidified in the catch portion 37 by natural cooling, and the solid protruding portion 21 is completed.

On a back side (a base end side) of the protruding portion 21, complementary shapes (that is, a central recessed portion 22, an annular projecting portion 23, and an annular groove 24) are formed as traces reflecting the tip projecting portion 41, the annular recessed portion 43, and the annular protrusion 42 of the ultrasonic horn 40.

As illustrated in (B) of FIG. 5 and (A) of FIG. 6, the completed protruding portion 21 is disposed in the catch portion 37 of the end cap, and is disposed adjacent to the catch surface 37a in the longitudinal direction of the belt molding and is in contact with the catch surface 37a. The molding body 10 and the end cap 30 are fixed to each other by mutual contact between the protruding portion 21 of the molding body and the catch surface 37a of the end cap, and rattling between the molding body 10 and the end cap 30 is prevented or controlled.

As a part of the side wall remaining portion 16 is melted by the ultrasonic horn 40 in the process of forming the protruding portion, as illustrated in an enlarged view illustrated in (B) of FIG. 6, a small part of the melted thermoplastic resin (19) leaks out to the periphery of the protruding portion 21, enters the gap S between the insertion portion 32 and the side wall remaining portion 16, and fills the gap S. However, the gap S is very narrow, and thus the molten resin 19 does not flow out of the gap S immediately, and can be appropriately retained in the gap S due to a surface tension or the like of the molten resin. The resin layer 19, which fills the gap S, is solidified in an integrated state with the protruding portion 21 over time, and the resin layer 19 solidified in the gap S serves as an aid for preventing or controlling rattling between the molding body 10 and the end cap 30.

Effects of First Embodiment

According to the first embodiment, the protruding portion 21 formed by melting and deforming a part of the side wall remaining portion 16 serving as the facing portion is caused to protrude on the vehicle exterior side relative to the vehicle interior side surface 32a of the insertion portion 32 of the end cap, and thus the movement of the end cap 30 in the direction opposite to the insertion direction is restricted based on the engagement (that is, mechanical interference) between the protruding portion 21 and the catch surface 37a of the insertion portion 32 of the end cap. Therefore, the end cap 30 can be prevented from falling off from the molding body 10.

In the method according to the first embodiment, the molding body 10 and the end cap 30 are not welded to each other, and thus the molding body 10 and the end cap 30 do not need to be formed of materials having close melting points, and there is little restriction on a selection of materials. In the protruding portion forming step, the molding body 10 is melted and deformed and there is no need to deform the end cap 30, and thus the end cap 30 may not be broken even if the end cap 30 is made of a material which is easy to break (for example, a PBT resin).

According to the first embodiment, the ultrasonic horn 40 is used, and thus a part of the side wall remaining portion 16 serving as the facing portion can be heated and melted in a pinpoint manner by the tip projecting portion 41 which is ultrasonically vibrated. On the other hand, by stopping the ultrasonic vibration, the melting of the resin can be stopped immediately (or in an extremely short time). Therefore, the deformation due to melting can be easily controlled, and the protruding portion 21 can be appropriately formed in a limited position or range.

By using the ultrasonic horn 40 as illustrated in (A) of FIG. 5, while the resin portion in contact with the tip projecting portion 41 is melted, the excessive molten resin can be processed as the annular projecting portion 23 appearing on the base end side of the protruding portion 21 by receiving the excessive molten resin into the annular recessed portion 43 and solidifying in the annular recessed portion. Therefore, the excessive molten resin can be prevented from leaking out to the periphery of the protruding portion 21 against an intention, and deterioration in appearance (degradation in appearance) can be prevented.

In the first embodiment, the catch portion 37 is set on the upper side portion of the insertion portion 32 of the end cap, and in response to this, the protruding portion 21 is formed at a position facing the catch portion 37 in the side wall remaining portion 16 of the molding body (see FIG. 3). By forming the protruding portion 21 at such a position, the protruding portion 21 is less likely to come into contact with the door panel 2, which is very preferable in design. The facing portion where the protruding portion 21 is to be formed is set in the side wall remaining portion 16, and thus an area of the facing portion usable for forming the protruding portion can be secured to be relatively large. Therefore, a volume of the protruding portion 21 obtained by the melting deformation of the facing portion (the side wall remaining portion 16) can be secured to a necessary extent, and the end cap 30 can be stably fixed to the molding body 10 by the protruding portion 21.

Second Embodiment

Figure 7:
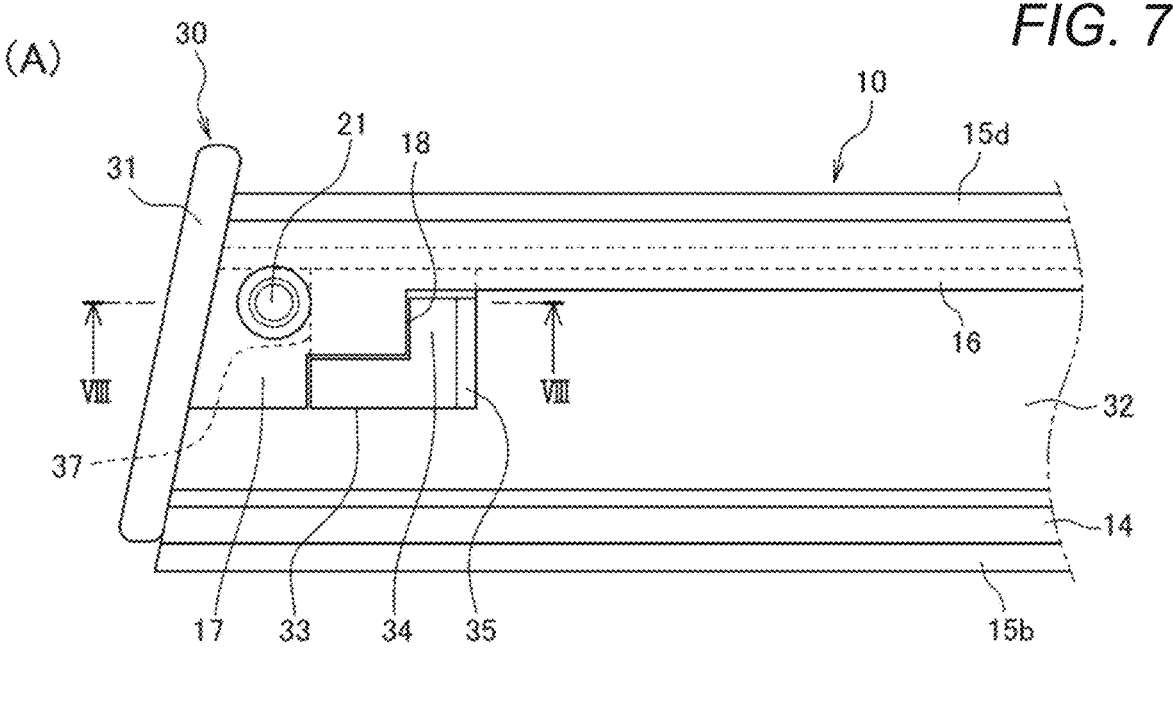
FIG. 7 illustrates a belt molding according to a second embodiment, in which (A) shows a rear side view corresponding to FIG. 3, and (B) shows a partial side view of an end cap.
Figure 7:
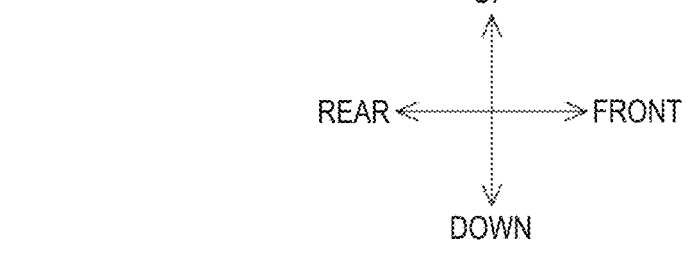
Figure 7:
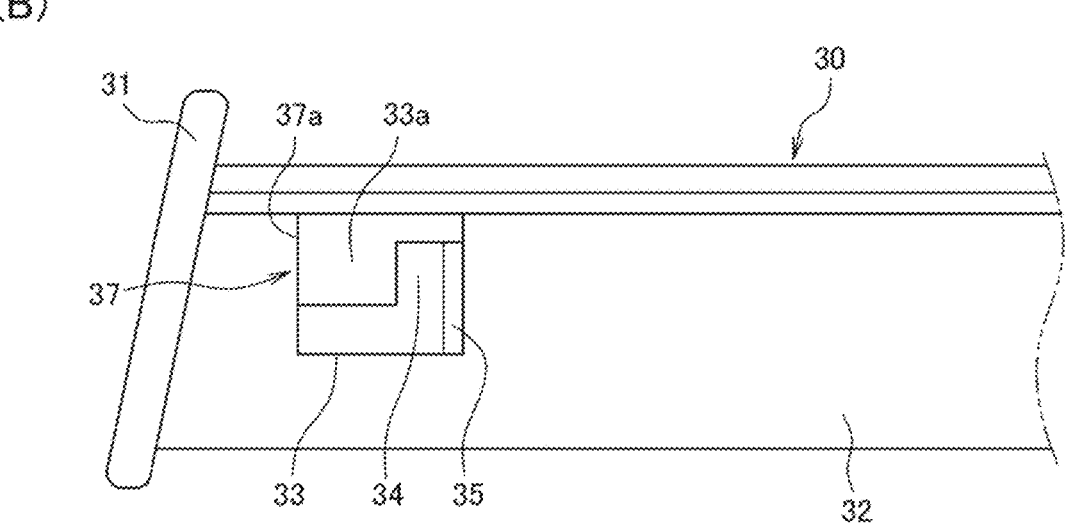
Figure 8:
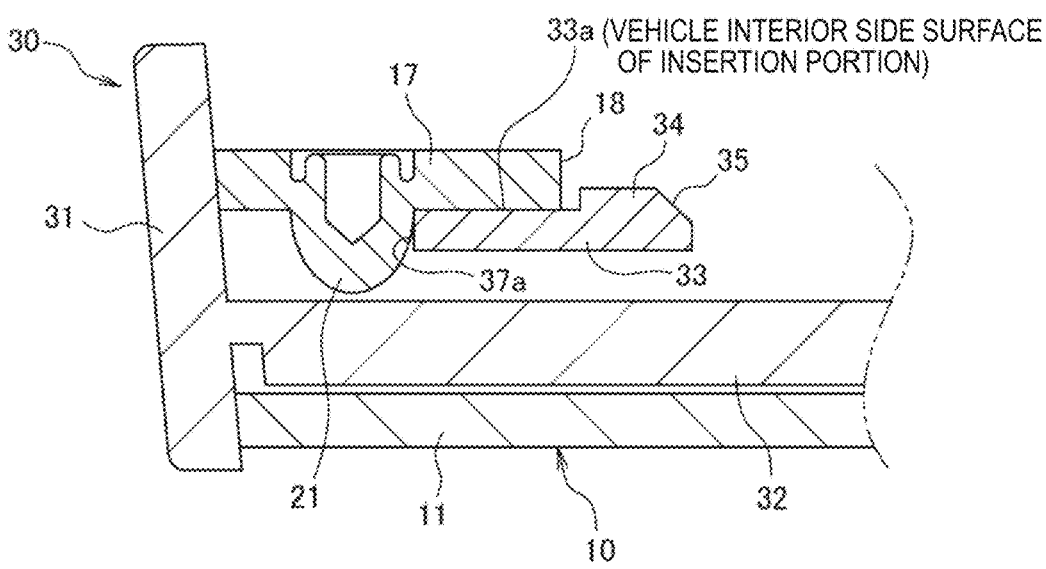
FIG. 8 illustrates cross sections taken along a line VIII-VIII in (A) of FIG. 7, in which (A) and (B) show a series of cross-sectional views illustrating an outline of a protruding portion forming step in the second embodiment.

FIG. 7 and FIG. 8 illustrate an outline of a belt molding according to a second embodiment of the present invention. Hereinafter, in order to avoid redundant description, differences from the first embodiment will be mainly described.

As illustrated in (A) and (B) of FIG. 7, in the second embodiment, unlike the first embodiment, the catch portion 37 is provided on a rear end side of the support tab 33 of the end cap 30. Specifically, in a side view illustrated in (B) of FIG. 7, an edge portion on the rear end side of the support tab 33 is illustrated as an edge portion extending straight in a vertical direction, and an upper portion of the edge portion extending straight in the vertical direction is set as the "catch portion 37". The straight catch portion 37 includes the planar catch surface 37a that extends in a depth direction (that is, vehicle interior and exterior directions or a width direction of the end cap) in the side view. The catch surface 37a is in a positional relation of intersecting the vehicle interior side surface 33a of the support tab 33. In the second embodiment, as illustrated in (A) of FIG. 7, the protruding portion 21 is formed on the extension portion 17, which is a part of the side wall remaining portion 16 of the molding body, corresponding to the catch portion 37 set on the rear end side of the support tab 33. The "molding body 10 before the protruding portion is formed" used in the second embodiment is substantially the same as the molding body 10 before the protruding portion is formed in the first embodiment.

(A) and (B) of FIG. 8 illustrate an outline of a protruding portion forming process in the second embodiment.

An inserting step of inserting the end cap 30 illustrated in (B) of FIG. 7 into the molding body 10 (before the protruding portion is formed) is substantially the same as the inserting step in the first embodiment. However, in an insertion completion state, as illustrated in (A) of FIG. 8, the support tab 33 (that is, a part of the insertion portion 32) of the end cap 30, in particular, in the vicinity of the catch portion 37 of the support tab 33, and the extension portion 17 (that is, a part of the side wall remaining portion 16) of the molding body are disposed to face each other. That is, in the present embodiment, the extension portion 17, which is a part of the side wall remaining portion 16, serves as a "facing portion that is positioned on a vehicle interior side relative to the insertion portion (the support tab 33) of the end cap and that faces the insertion portion (33)".

In a protruding portion forming step subsequent to the inserting step, by melting and deforming a portion of the extension portion 17 serving as the facing portion, which is closer to the lid portion 31 relative to the catch surface 37*a* of the end cap, by the ultrasonic horn 40, the protruding portion 21 protruding on a vehicle exterior side relative to the vehicle interior side surface 33*a* of the support tab 33 (that is, a vehicle interior side surface of the insertion portion) of the end cap is formed in the molding body 10. As illustrated in (B) of FIG. 8, the completed protruding portion 21 is disposed adjacent to the catch portion 37 of the end cap, and is disposed adjacent to the catch surface 37*a* in a longitudinal direction of the belt molding and is in contact with the catch surface 37*a*. Accordingly, the end cap 30 is restricted from moving backward (falling off).

A technical significance of the protruding portion 21 in the second embodiment is basically the same as that of the protruding portion 21 in the first embodiment. The belt molding according to the second embodiment has the same functions and effects as those of the first embodiment.

Third Embodiment

Figure 9:
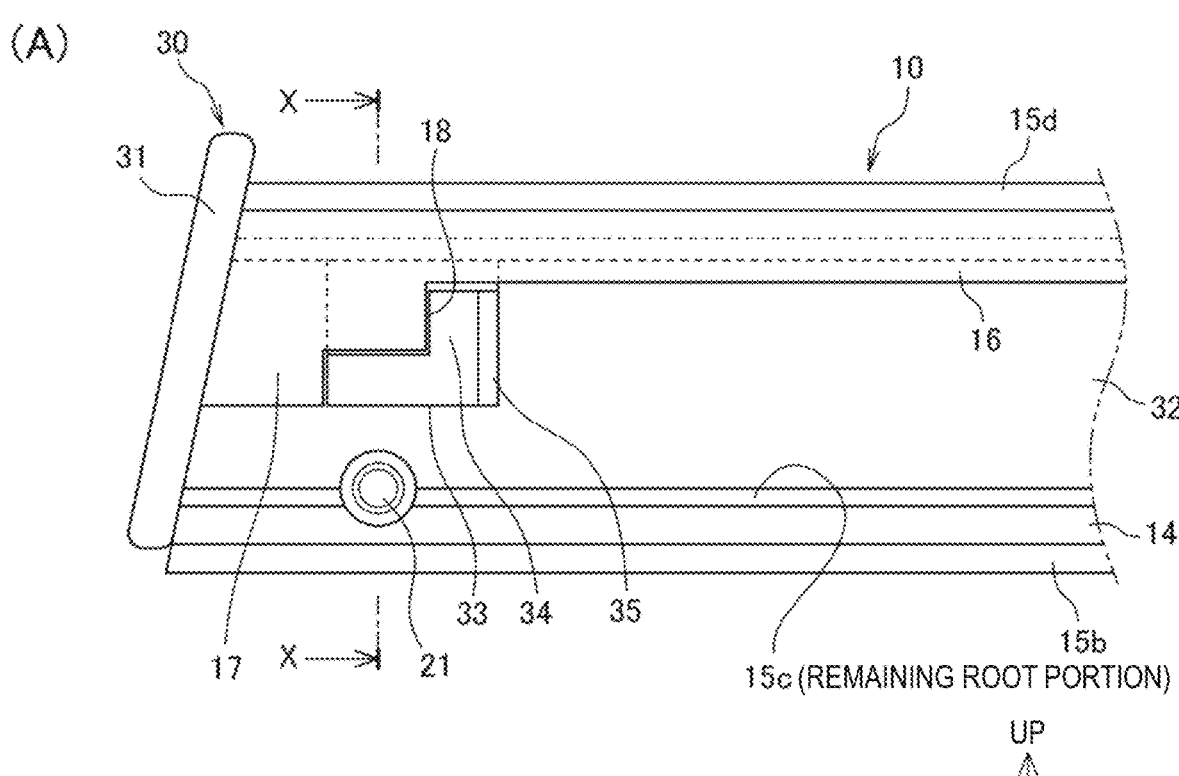
FIG. 9 illustrates a belt molding according to a third embodiment, in which (A) shows a rear side view corresponding to FIG. 3, and (B) shows a partial side view of an end cap.
Figure 9:
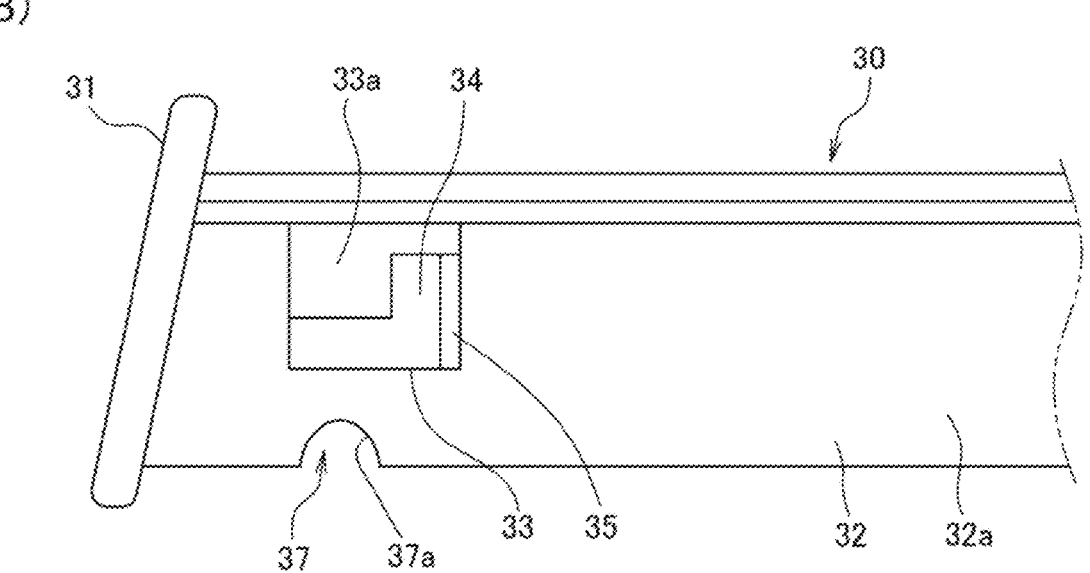
Figure 10:
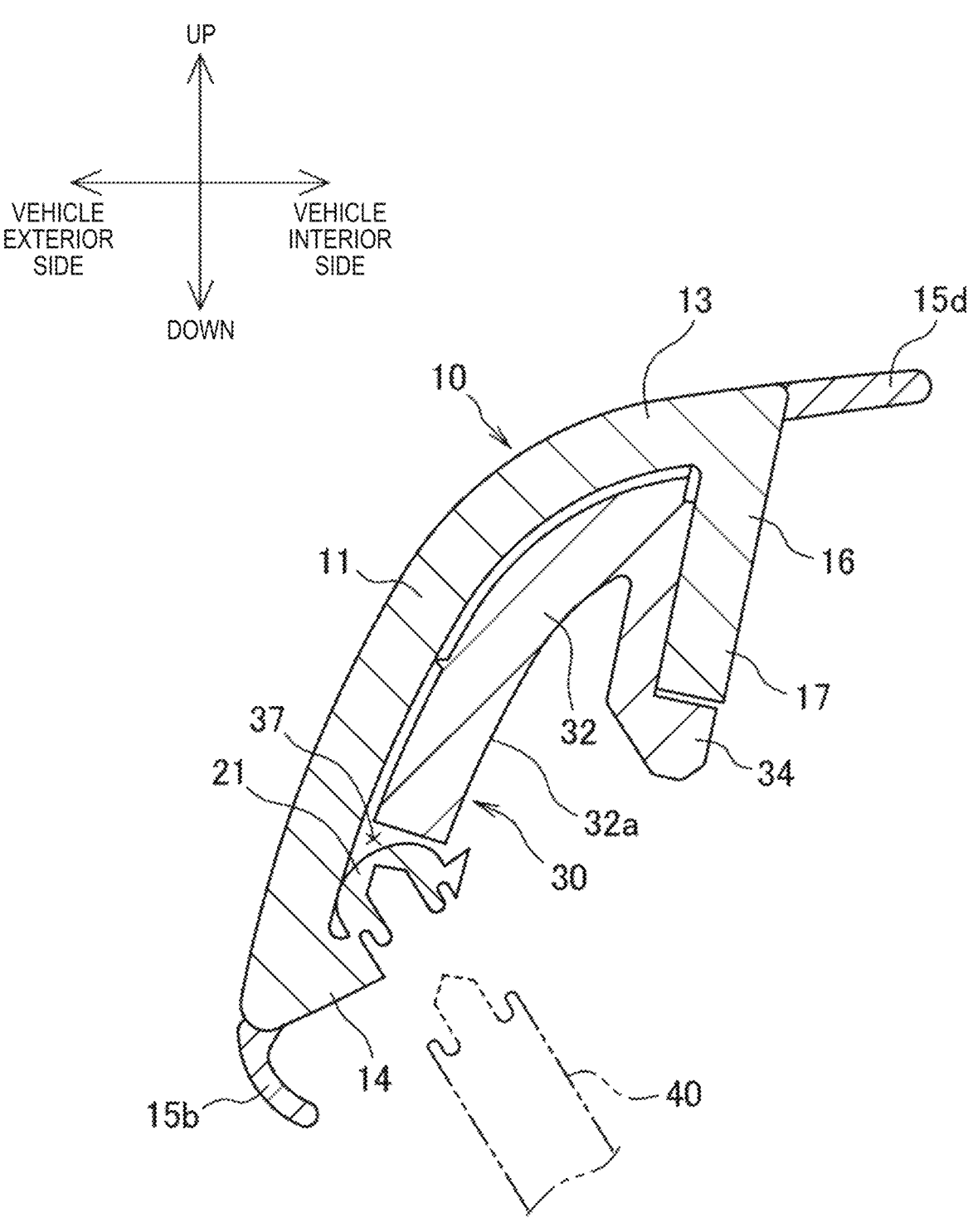
FIG. 10 is a cross-sectional view taken along a line X-X in (A) of FIG. 9 (illustrating an outline of a protruding portion forming step in a third embodiment).

FIG. 9 and FIG. 10 illustrate an outline of a belt molding according to a third embodiment of the present invention. Hereinafter, in order to avoid redundant description, differences from the first embodiment will be mainly described.

As illustrated in (A) and (B) of FIG. 9, in the third embodiment, unlike the first embodiment, the catch portion 37 is formed on a lower side portion of the insertion portion 32 of the end cap 30. The catch portion 37 is a recessed portion cut out in a substantially semicircular shape in a side view illustrated in (B) of FIG. 9, and the semicircular shape corresponds to an outer shape of a tip of an ultrasonic horn. The catch portion 37 includes the curved catch surface 37*a* on an inner side of the recessed shape, the catch surface 37*a* extending in vehicle interior and exterior directions (a width direction of the end cap). The catch surface 37*a* is in a positional relation of intersecting the vehicle interior side surface 32*a* of the insertion portion 32 of the end cap. In the third embodiment, as illustrated in (A) of FIG. 9 and FIG. 10, the protruding portion 21 is formed by using the folded elongated protrusion 14 and the holding lip 15*c* (a remaining root portion) of a molding body in correspondence with the catch portion 37 provided on the lower side portion of the insertion portion 32 of the end cap. The "molding body 10 before the protruding portion is formed" used in the third embodiment is substantially the same as the molding body 10 before the protruding portion is formed in the first embodiment.

FIG. 10 generally suggests a protruding portion forming process in the third embodiment.

An inserting step of inserting the end cap 30 illustrated in (B) of FIG. 9 into the molding body 10 (before the protruding portion is formed) is substantially the same as the inserting step in the first embodiment. However, in an insertion completion state, as suggested in (A) of FIG. 9 and FIG. 10, the lower side portion (in particular, in the vicinity of the catch portion 37) of the insertion portion 32 of the end cap 30 and the folded elongated protrusion 14 and the holding lip 15*c* (the remaining root portion) of the molding body 10 are disposed to face each other. That is, in the present embodiment, the folded elongated protrusion 14 and the holding lip 15*c* (the remaining root portion) continuous with the folded elongated protrusion 14 are integrated with each other and serve as a "facing portion that is positioned on a vehicle interior side relative to the insertion portion (32) of the end cap and that faces the insertion portion (32)" (see FIG. 10 and (A) of FIG. 5 together if necessary).

In a protruding portion forming step subsequent to the inserting step, by melting and deforming a portion of the folded elongated protrusion 14 and the holding lip 15*c* (the remaining root portion) serving as the facing portion, which is closer to the lid portion 31 relative to the catch surface 37*a* of the end cap, by the ultrasonic horn 40, the protruding portion 21 protruding on a vehicle exterior side relative to the vehicle interior side surface 32*a* of the insertion portion 32 of the end cap is formed in the molding body 10 (see FIG. 10). As illustrated in (A) of FIG. 9 and FIG. 10, the completed protruding portion 21 is disposed in the catch portion 37 of the end cap, and is disposed adjacent to the catch surface 37*a* in the longitudinal direction of the belt molding and is in contact with the catch surface 37*a*. Accordingly, the end cap 30 is restricted from moving backward (falling off).

A technical significance of the protruding portion 21 in the third embodiment is basically the same as that of the protruding portion 21 in the first embodiment. The belt molding according to the third embodiment has the same functions and effects as those of the first embodiment.

Modification and Preferred Embodiments

The present invention is not limited to the first to third embodiments, and may be implemented in the following manner.

Figure 11:
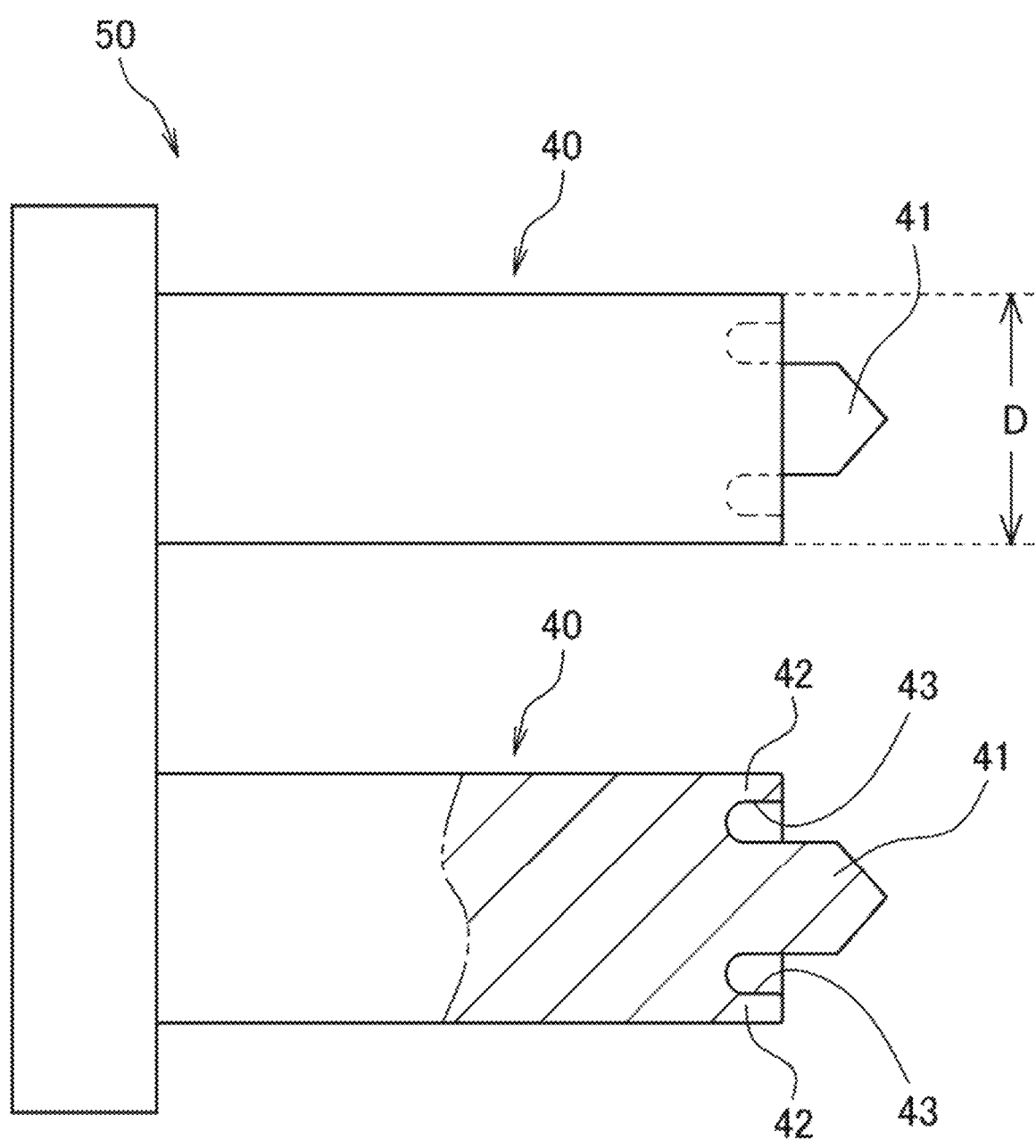
FIG. 11 is a schematic diagram illustrating another example (a double installation type) of an ultrasonic horn.

In each of the above embodiments, only one protruding portion 21 is provided for one belt molding, but two or more protruding portions 21 may be formed for one belt molding. By forming a plurality of protruding portions 21, the end cap 30 is less likely to come off from the molding body 10, and the end cap 30 can be more firmly fixed to the molding body 10. In this case, it is preferable to use an ultrasonic melting jig 50 in which two ultrasonic horns 40 are arranged side by side as illustrated in FIG. 11. Work time can be reduced by using the jig 50.

It is preferable that an outer diameter D of the ultrasonic horn 40 (see FIGS. 5 and 11) is not out of a range of the facing portion. For example, in FIG. 5, the outer diameter D of the ultrasonic horn 40 is preferably smaller than a height h of the side wall remaining portion 16 serving as the facing portion by 1.0 mm or more. By setting dimensions in this manner, the resin obtained by melting a part of the facing portion can be caused to enter the annular recessed portion 43 of the ultrasonic horn 40 and can be solidified without overflowing to the periphery.

In the above embodiments, the ultrasonic horn 40 is used, but instead of the ultrasonic horn 40, a thermocouple may be used to form the protruding portion 21.

In the above embodiments, the protruding portion is formed by melting and deforming a part of the facing portion, but the protruding portion may be formed by giving an external force to a part of the facing portion.

REFERENCE SIGNS LIST

1: vehicle door
2: door panel

3: belt molding
10: molding body
11: vehicle exterior side wall portion
12: vehicle interior side wall portion
13: top wall portion
14: folded elongated protrusion ("facing portion" in third embodiment)
16: side wall remaining portion ("facing portion" in first embodiment)
17: extension portion ("facing portion" in second embodiment)
18: engaged portion
19: resin layer (derived from molten thermoplastic resin)
21: protruding portion
30: end cap
31: lid portion
32: insertion portion
32a: vehicle interior side surface of insertion portion
33: support tab (a part of insertion portion)
33a: vehicle interior side surface of support tab (also vehicle interior side surface of insertion portion)
34: engaging portion
37: catch portion
37a: catch surface
40: ultrasonic horn
41: tip projecting portion
42: annular protrusion
43: annular recessed portion
S: gap

The invention claimed is:

1. A method for producing a belt molding configured to be attached along an upper edge of a door panel of a vehicle door, the method comprising:

preparing a molding body extending in a longitudinal direction and made of a thermoplastic resin, the molding body comprising a vehicle exterior side wall portion, a vehicle interior side wall portion facing the vehicle exterior side wall portion, and a top wall portion integrally connecting the vehicle exterior side wall portion and the vehicle interior side wall portion, the vehicle interior side wall portion comprising a side wall remaining portion formed by removing a part of the vehicle interior side wall portion in a vicinity of an end of the molding body;

preparing an end cap configured to be attached to one end portion of the molding body, the end cap comprising a lid portion configured to close an opening end of the molding body, and an insertion portion extending from the lid portion and configured to be inserted between the vehicle exterior side wall portion of the molding body and the side wall remaining portion, the insertion portion comprising a vehicle interior side surface extending along an insertion direction of the end cap on a vehicle interior side, the insertion portion on which a catch surface provided to intersect the vehicle interior side surface is formed;

inserting the insertion portion of the end cap into the molding body such that the insertion portion of the end cap is disposed to face a facing portion that is a part of the molding body while the facing portion is positioned on a vehicle interior side relative to the insertion portion and faces the insertion portion; and forming a protruding portion in the molding body, the protruding portion protruding on a vehicle exterior side relative to the vehicle interior side surface of the insertion portion of the end cap, by deforming a portion of the facing portion of the molding body, the portion of the facing portion of the molding body being closer to the lid portion of the end cap relative to the catch surface, wherein the end cap is prevented from moving in a direction opposite to the insertion direction in a state in which the protruding portion of the molding body and the catch surface of the end cap engage each other.

2. The method for producing a belt molding according to claim 1, wherein in the forming the protruding portion, a part of the facing portion of the molding body is melted and deformed to form the protruding portion.

3. The method for producing a belt molding according to claim 2, wherein in the forming the protruding portion, an ultrasonic horn is brought into contact with the facing portion of the molding body to melt the part of the facing portion.

4. The method for producing a belt molding according to claim 3, wherein the ultrasonic horn comprises a tip projecting portion formed at a tip of the ultrasonic horn and an annular recessed portion formed at an outer peripheral edge of the tip projecting portion.

5. The method for producing a belt molding according to claim 2, wherein in the forming the protruding portion, as the part of the facing portion of the molding body is melted, a part of a melted thermoplastic resin enters between the facing portion and the insertion portion around the protruding portion and fills a gap, and then is solidified.

6. The method for producing a belt molding according to claim 1, wherein an engaged portion is formed on the side wall remaining portion of the molding body which has been prepared, and an engaging portion configured to engage the engaged portion of the molding body is formed on the insertion portion of the end cap which has been prepared, and wherein in the inserting the insertion portion, the end cap is temporarily positioned with respect to the molding body based on mutual engagement between the engaging portion and the engaged portion.

7. The method for producing a belt molding according to claim 1, wherein after completion of formation of the protruding portion, the protruding portion and the catch surface are disposed adjacent to each other in the longitudinal direction of the belt molding and are in contact with each other.

*    *    *    *    *